Dec. 11, 1956 W. C. LEVENGOOD 2,773,775
GLASS COMPOSITION AND BATCH THEREFOR
Filed Dec. 21, 1953
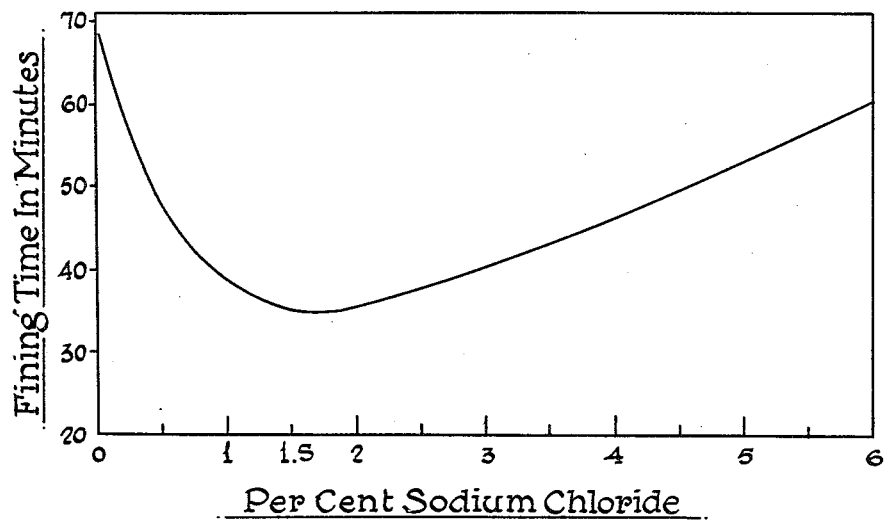
INVENTOR.
William C. Levengood
BY
Nobbe & Swope
ATTORNEYS

United States Patent Office 2,773,775
Patented Dec. 11, 1956

2,773,775
GLASS COMPOSITION AND BATCH THEREFOR

William C. Levengood, Toledo, Ohio, assignor to Libbey-Owens-Ford Glass Company, Toledo, Ohio, a corporation of Ohio Application December 21, 1953, Serial No. 399,425

10 Claims. (Cl. 106—52)

The present invention relates to improved glass compositions and to batches from which they are made.

An object of the invention is to produce a glass of high quality and relatively free from seeds.

Another object of the invention is to provide a glass of a composition having a relatively shorter fining time which enables an increased output of glass to be obtained in a given period of time.

A further object of the invention is to provide a glass batch ingredient which when added to a base soda-lime-silica glass batch will produce highly desirable results.

In carrying out the invention, the above objects are attained by combining a desired proportion of sodium chloride crystallized with soda ash to provide a preparation which, when added to a base soda-lime-silica glass batch, will reduce the fining time and result in a glass of relative high quality.

It is well known that salt, as such, may be added to glass batches for a variety of purposes. For example, salt may be added to a batch to convert opal to an alabaster glass, or it may be added in the form of metallic salts or halogen salts to modify the color of glasses, or salt may be added along with barium sulphate to a batch, the combination acting as a fining agent.

Also the addition of soda ash, in varying quantities, to a glass batch has long been known and used in the glass making art. However, the sodium chloride content of the soda ash was heretofore considered to be an impurity and ordinarily glass manufacturers were inclined to ask for lesser amounts of sodium chloride in the soda ash rather than for larger amounts. However, in accordance with this invention, it has been found that under certain conditions and within certain ranges the crystallized sodium chloride content of the soda ash produces results quite different from previous held theory and knowledge.

In conventional use, the soda ash content of the bach is used as a flux material and, as mentioned above, the sodium chloride content of the soda ash was purposely kept to a minimum because it was thought to have an adverse effect upon the quality of the glass. The sodium chloride content normally found crystallized in commercial soda ash is approximately 0.35%. However, according to this invention, it has been found that if the amount of sodium chloride crystallized with the soda ash is increased, within certain limits, above that normally found in commercial soda ash, that the fining time of the glass is markedly decreased and thus an increase in glass production may be obtained for a given period of time.

In carrying out the invention, sodium chloride in the desired proportion is first crystallized with the soda ash and the resultant preparation is then added to a conventional soda-lime-silica glass batch in place of ordinary soda ash, which batch may then be melted and fined in the usual manner. It is to be pointed out that the salt must be crystallized with the soda ash content of the batch to obtain a reduction in the fining time and that a reduction in fining time is not obtained if the salt is crystallized with any of the other components of the batch such as sand, etc. One typical sheet glass batch is given in Table I below.

TABLE I
*Base glass batch*

| | Pounds |
|---|---|
| Sand | 1000 |
| Dolomitic limestone | 110 |
| Calcium limestone | 50 |
| Soda ash | 290 |
| Salt cake | 40 |
| Aplite | 55 |
| Arsenic oxide | 0.2 |
| Carbon | 2.0 |

The soda ash in which the sodium chloride is crystallized is added to the above batch and the batch then melted and subsequently fined according to regular procedures to a temperature of approximately 2575° F. It has been found that by increasing the amount of sodium chloride crystallized in the soda ash the fining time can be substantially reduced. Thus, as shown in the single figure of the accompanying drawing, the fining time decreases from that obtained when no sodium chloride is contained in the soda ash to a minimum fining time when the soda ash contains 1.5% sodium chloride after which the fining time again gradually increases with the use of increased amounts of sodium chloride in the soda ash.

The fining times for the batch given in Table I using various percentages of sodium chloride crystallized with the soda ash are given in the following Table II. These fining times were obtained by melting the batch in small platinum crucibles which were heated to the uniform temperature of 2575° F. for various periods of time, to determine the minimum time necessary to obtain seed free glass, which is defined as the fining time.

TABLE II

*Fining times of the base glass batch containing various amounts of sodium chloride crystallized with the soda ash*

| Percent sodium chloride: | Fining time (minutes) |
|---|---|
| 0 | 68 |
| 0.2 | 60 |
| 0.35 | 55 |
| 0.6 | 46 |
| 0.8 | 42 |
| 1.0 | 40 |
| 1.5 | 36 |
| 2.0 | 38 |
| 2.5 | 39 |
| 3.0 | 42 |
| 4.0 | 47 |
| 5.0 | 54 |
| 6.0 | 61 |

It will be noted in the above Table II that the shortest fining time was obtained when the sodium chloride content equaled 1.5% of the weight of the soda ash, which composition gave a fining time of thirty-six minutes. In contrast, it will be noted that commercial soda ash having a sodium chloride content of 0.35% by weight gave a fining time of fifty-five minutes, while a pure soda ash containing no sodium chloride at all gave a fining time of sixty-eight minutes.

From the foregoing, it is evident that the use of soda ash containing 1.5% sodium chloride reduced the fining time by approximately 25% over commercial soda ash containing 0.35% sodium chloride, and reduced the fining time over a commercially pure soda ash containing no sodium chloride by approximately 47%. On the other hand, it will be noted that when the percentage of sodium chloride was increased above 1.5%, the fining time of the glass again increased as it does when the percentage of sodium chloride is reduced below 1.5%. Such reductions in fining time are of course extremely valuable in the large scale production of glass inasmuch as they allow great increases in production to be obtained while utilizing the same plant equipment and the same labor force.

Again referring to the drawing, it will be seen that beneficial effects from using crystallized sodium chloride in the soda ash are obtainable within a relatively wide range. Thus, improved results are obtained, over the use of commercial soda ash, when the sodium chloride content is anywhere between 0.6% and 4.0%. Also, a more substantial reduction in fining time is noted when the sodium chloride content is between 0.8% and 3.0%, the fining time in each case being forty-two minutes. However, the preferred range of sodium chloride is 1.2% to 1.8%, with the optimum amount being 1.5%.

It is again pointed out that in order to obtain the reduction in fining time the sodium chloride must be crystallized with the soda ash. It cannot be accomplished simply by mixing sodium chloride with soda ash and then adding it to the other batch ingredients. Furthermore, it is necessary that the sodium chloride be crystallized with the soda ash and not with any of the other batch ingredients such as the sand, etc. as such preparations have not been found to have any beneficial effect upon the fining time of the glass.

As previously noted, the present invention resides essentially in the use of sodium chloride crystallized with soda ash in predetermined percentages in a batch for producing a soda-lime-silica glass, the soda ash having the sodium chloride crystallized therein being mixed with other standard batch ingredients as, for example, those listed in Table I above. By varying the amounts of the batch ingredients, glasses of different compositions within the spirit of this invention can be obtained. As illustrative of the invention, glass compositions as set forth in Table III below may be produced.

TABLE III

| | Percent |
|---|---|
| $SiO_2$ | 70 to 76 |
| CaO | 8.0 to 15 |
| MgO | 0 to 5.0 |
| $Al_2O_3$ | 0.2 to 1.5 |
| $Na_2O$ | 12.5 to 16.0 |

(The remainder including minor amounts of arsenic, sulphates, borates, phosphates, and oxides in the second periodic group other than calcium oxide and magnesium oxide.)

I claim:

1. A batch for making soda-lime-silica glass, consisting essentially of the standard batch ingredients and wherein sodium chloride is crystallized with the soda ash content of the batch and amounts to substantially 0.6% to 4.0% of the weight of the crystallized composition.

2. A batch for making clear transparent soda-lime-silica glass, essentially of the standard batch ingredients mixed with the crystallized product of sodium chloride and soda ash, the sodium chloride content being 0.8% to 3.0% by weight of the crystallized product.

3. The batch of claim 2, in which the crystallized product of soda ash and sodium chloride contains 1.2% to 1.8% by weight of sodium chloride.

4. The batch of claim 2, in which the crystallized product of sodium chloride and soda ash contains approximately 1.5% by weight of sodium chloride.

5. A batch for making a clear transparent glass, consisting essentially of the following ingredients in substantially the weight proportions given:

| | Pounds |
|---|---|
| Sand | 1000 |
| Dolomitic limestone | 110 |
| Calcium limestone | 50 |
| Soda ash | 290 |
| Salt cake | 40 |
| Aplite | 55 |
| Arsenic oxide | 0.2 |
| Carbon | 2.0 | and in which the soda ash contains 0.8% to 3.0% by weight of sodium chloride crystallized therein.

6. A batch for making a clear transparent glass, consisting essentially of the following ingredients in substantially the weight proportions given:

| | Pounds |
|---|---|
| Sand | 1000 |
| Dolomitic limestone | 110 |
| Calcium limestone | 50 |
| Soda ash | 290 |
| Salt cake | 40 |
| Aplite | 55 |
| Arsenic oxide | 0.2 |
| Carbon | 2.0 | and in which the soda ash contains 1.2% to 1.8% by weight of sodium chloride crystallized therein.

7. A batch for making a clear transparent glass, consisting essentially of the following ingredients in substantially the weight proportions given:

| | Pounds |
|---|---|
| Sand | 1000 |
| Dolomitic limestone | 110 |
| Calcium limestone | 50 |
| Soda ash | 290 |
| Salt cake | 40 |
| Aplite | 55 |
| Arsenic oxide | 0.2 |
| Carbon | 2.0 | and in which the soda ash contains approximately 1.5% by weight of sodium chloride crystallized therein.

8. A soda-lime-silica glass consisting essentially of the following composition:

| | Percent |
|---|---|
| $SiO_2$ | 70 to 76 |
| CaO | 8.0 to 15 |
| MgO | 0 to 5 |
| $Al_2O_3$ | 0.2 to 1.5 |
| $Na_2O$ | 12.5 to 16.0 | in which sodium chloride has been crystallized with the soda ash content of the batch used in producing the above glass in substantially the amount of 0.6% to 4.0% by weight of the crystallized composition.

9. A soda-lime-silica glass of the composition defined in claim 8, in which the batch used in producing the glass contained soda ash having crystallized therewith sodium chloride in the amount of 0.8% to 3.0% of the weight of the crystallized composition.

10. A soda-lime-silica glass of the composition defined in claim 8, resulting from a batch containing sodium chloride crystallized with the soda ash content of the batch used in producing the glass in the amount of 1.2% to 1.8% of the weight of the crystallized composition.

References Cited in the file of this patent

UNITED STATES PATENTS

| 2,161,711 | Keep et al. | June 6, 1939 |
| 2,655,452 | Barnes et al. | Oct. 13, 1953 |